(12) United States Patent
Rashidy et al.

(10) Patent No.: US 7,780,228 B2
(45) Date of Patent: Aug. 24, 2010

(54) AUTOMOTIVE VEHICLE OPEN AIR SYSTEM

(75) Inventors: Mostafa Rashidy, West Bloomfield, MI (US); George Albert Corder, Romulus, MI (US); James William Brinkmeier, South Rockwood, MI (US)

(73) Assignee: Specialty Vehicle Acquisition Corp., Los Angeles, CA (US)

( * ) Notice: Subject to any disclaimer, the term of this patent is extended or adjusted under 35 U.S.C. 154(b) by 0 days.

(21) Appl. No.: 12/209,283

(22) Filed: Sep. 12, 2008

(65) Prior Publication Data

US 2010/0066130 A1    Mar. 18, 2010

(51) Int. Cl.
 B60J 7/047 (2006.01)
 B60J 7/053 (2006.01)
 B60J 10/12 (2006.01)

(52) U.S. Cl. .............. 296/220.01; 296/216.05; 296/216.08; 296/222

(58) Field of Classification Search ............ 296/216.04, 296/216.05, 216.08, 220.01, 222
See application file for complete search history.

(56) References Cited

U.S. PATENT DOCUMENTS

| | | | | |
|---|---|---|---|---|
| 4,142,759 | A | * | 3/1979 | Bienert ............ 296/217 |
| 4,362,332 | A | | 12/1982 | Garnham |
| 4,659,140 | A | | 4/1987 | Fuerst et al. |
| 4,688,848 | A | | 8/1987 | Niwa |
| 4,759,489 | A | * | 7/1988 | Pigott ............ 228/102 |
| 4,934,754 | A | | 6/1990 | Cioffi |
| 4,986,598 | A | | 1/1991 | Yamauchi et al. |
| 5,671,970 | A | | 9/1997 | Edelmann |
| 6,056,352 | A | | 5/2000 | Ewing et al. |
| 6,129,413 | A | | 10/2000 | Klein |
| 6,199,944 | B1 | | 3/2001 | Lee et al. |
| 6,279,989 | B1 | * | 8/2001 | Marchart et al. ....... 296/193.04 |

(Continued)

FOREIGN PATENT DOCUMENTS

EP    0101322    * 2/1984

(Continued)

OTHER PUBLICATIONS

ASC pp. 9-21 of schematic diagrams and photographs of actual components of the panoramic roof mechanism utilized in the Cadillac SRX vehicle believed to have been offered for sale prior to Sep. 2008.

*Primary Examiner*—Dennis H Pedder
(74) *Attorney, Agent, or Firm*—Harness, Dickey & Pierce, P.L.C.

(57) ABSTRACT

An open air system for an automotive vehicle includes a moveable roof panel and can include a single pair of guide tracks that extends along the vehicle through which the moveable roof member travels. A backlite of the open air system and the roof panel can have a similar transverse contour. A seal member can define a boundary between a dry area and a wet area and the guide tracks can be positioned outside of the seal member in the wet area. A wind deflecting assembly can be included and can have a wind deflector moveable between a retracted position and a raised position and can be automatically actuated by a drive member that drives movement of the roof panel. The open air system can be a modular open air system that can be installed into a vehicle as a modular unit.

19 Claims, 14 Drawing Sheets

U.S. PATENT DOCUMENTS

| | | |
|---|---|---|
| 6,299,245 B1 | 10/2001 | Thiele et al. |
| 6,419,308 B1 | 7/2002 | Corder et al. |
| 6,485,094 B2 | 11/2002 | Corder et al. |
| D483,317 S | 12/2003 | Dowdey |
| D483,716 S | 12/2003 | Dowdey |
| 6,666,503 B1 | 12/2003 | Sorensen |
| 6,672,638 B2 | 1/2004 | Corder et al. |
| 6,827,392 B2 | 12/2004 | Doncov et al. |
| 6,830,290 B2 * | 12/2004 | De Gaillard ........... 296/216.03 |
| 6,890,022 B2 | 5/2005 | Doncov et al. |
| 6,910,733 B2 | 6/2005 | Raasakka |
| 6,945,590 B2 | 9/2005 | Doncov et al. |
| 6,971,710 B1 | 12/2005 | Raasakka et al. |
| 7,048,329 B2 | 5/2006 | Heyn |

FOREIGN PATENT DOCUMENTS

| | | | |
|---|---|---|---|
| EP | 0992384 | * | 4/2000 |
| FR | 1357364 | * | 2/1964 |
| JP | 0139429 | * | 6/1991 |
| JP | 405058161 | * | 3/1993 |
| WO | WO02/096685 | | 12/2002 |

* cited by examiner

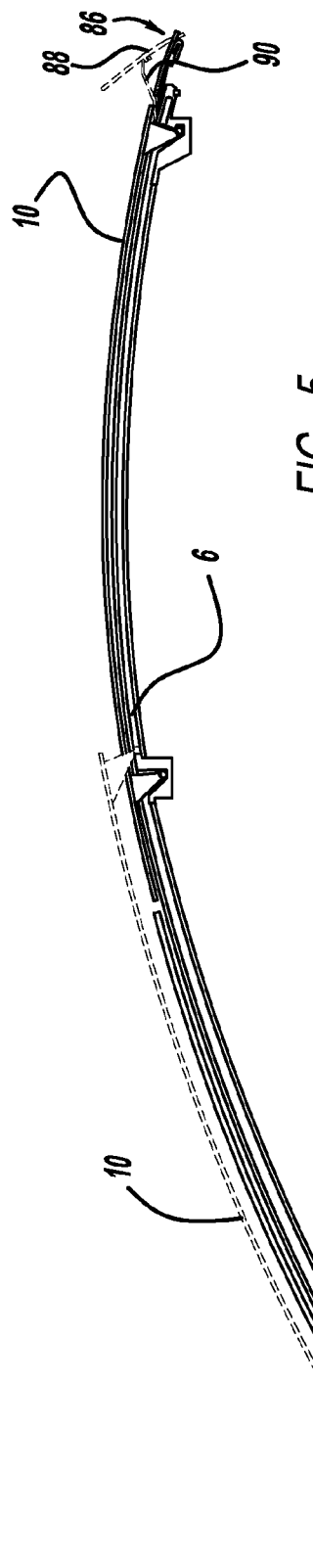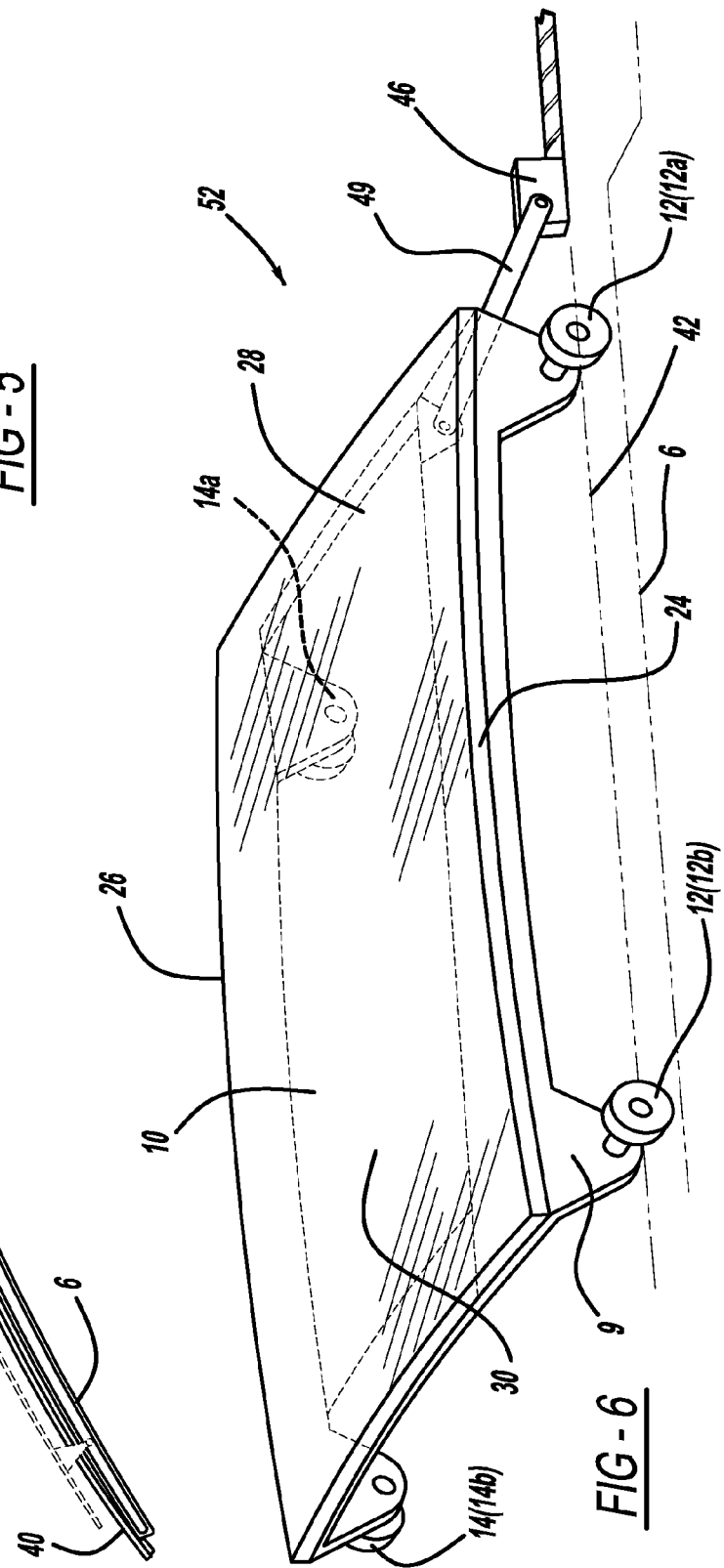
FIG-5
FIG-6

AUTOMOTIVE VEHICLE OPEN AIR SYSTEM

FIELD

The present disclosure relates to automotive vehicles and, more particularly, to open air systems for automotive vehicles.

BACKGROUND AND SUMMARY

Automotive vehicles come in a variety of shapes, sizes and configurations. To provide a more pleasing driving experience, some automotive vehicles include a sunroof or moveable roof panels. A sunroof and moveable roof panels are collectively referred to herein as "roof panels." The moveable roof panels may be capable of tilting to provide extra ventilation for the interior vehicle and/or may be capable of moving between a position corresponding to providing an enclosed space for the passenger seating area and a position wherein an opening of the vehicle roof is realized to provide an open air driving experience. Such systems may be referred to as automotive vehicle open air systems. It can be desirable for the automotive vehicle open air system to be of a simple design and to provide an aesthetically pleasing appearance. Additionally, it could be advantageous if the open air system can be installed as a modular unit. Moreover, it would be advantageous if the open air system were economical to manufacture.

An automotive vehicle open air system according to one aspect of the present disclosure includes an opening, first and second guide tracks, a roof panel, and first and second pairs of guide members. The opening has longitudinally extending first and second sides that are transversely spaced apart. The first guide track extends longitudinally along the first side of the opening. The second guide track extends longitudinally along the second side of the opening. The roof panel is moveable relative to the opening between a first position covering the opening and a second position exposing at least a portion of the opening. The roof panel has longitudinally extending first and second sides that are transversely spaced apart. The first pair of guide members is coupled to the first side of the roof panel and engaged with the first guide track. The second pair of guide members is coupled to the second side of the roof panel and engaged with the second guide track. The first and second pairs of guide members each include front and rear guide members coupled respectively to front and rear portions of the roof panel on the respective first and second sides of the roof panel. The first and second pairs of guide members move along the respective first and second guide tracks as the roof panel moves between the first and second positions. The use of a single guide track on each side of the vehicle can provide a simpler mechanism and may be easier and more cost-efficient to manufacture than a traditional two-piece guide track configuration.

In another aspect, an automotive vehicle open air system includes a fixed roof member, a backlite, and a moveable roof assembly. The backlite is disposed in the fixed roof member and has a first transverse contour. The roof assembly includes a roof panel moveable in a fore and aft direction relative to the fixed roof member between first and second positions. A majority of the roof panel is forward of the backlite when in the first position, and a portion of the roof panel is disposed above a portion of the backlite when in the second position. The roof panel has a second transverse contour. The first transverse contour of the backlite and the second transverse contour of the roof panel are substantially similar. The substantially similar contours can allow for closer nesting of the roof panel above the backlite. The substantial similar contours arrangement can also provide an aesthetically pleasing appearance for the vehicle.

In yet another aspect, an automotive vehicle open air system includes a fixed roof member, at least one guide track, a backlite, and a moveable roof assembly. The moveable roof assembly includes a roof panel, at least one guide member, and a longitudinally extending seal member. The at least one guide member is coupled to the roof panel and moves along the at least one guide track with the movement of the roof panel between first and second positions. The longitudinally extending seal member is sealingly engaged with the roof panel when in the first position and is disengaged from the roof panel when in the second position. The seal member defines a boundary between a dry area and a wet area. The at least one guide track is positioned outside of the seal member in the wet area. The positioning of the guide track may allow for larger open air or open roof space above the passenger compartment.

In still another aspect, an automotive vehicle open air system includes a fixed roof member, a track, a roof panel, a drive member, and a wind deflecting assembly. The roof panel is longitudinally moveable relative to the fixed roof member between a closed position and an open position. The drive member is coupled to the roof panel and moves along the track, driving movement of the roof panel between the open and closed positions. The wind deflecting assembly is coupled to the fixed roof member and includes a wind deflector and a biasing member. The wind deflector is moveably coupled to the fixed roof member and moveable between a retracted position and a raised position. The biasing member biases the wind deflector to the raised position. A portion of the drive member engages and disengages with the biasing member during movement along the track and causes the wind deflector to move between the raised and retracted positions. Such simple yet highly effective design makes the operation of the wind deflector easy and may lower manufacturing and installation cost.

In yet another aspect, a modular automotive vehicle open air system includes a frame, a backlite, an opening, and a moveable roof assembly. The frame has an outer periphery. The backlite is fixedly mounted in the frame. The opening is through the frame forward of the backlite. The moveable roof assembly is coupled to the frame and includes at least one roof panel moveable in a fore and aft direction relative to the frame between first and second positions. The first position covers the opening and the second position exposes the opening. The frame, the backlite, and the moveable roof assembly are adapted to be installed in the vehicle as a modular unit. The modular system can facilitate assembly into the vehicle and manufacturing efficiency can be improved.

According to another aspect, a method of operating an automotive vehicle open air system includes: positioning a moveable roof panel in a first position covering a roof opening; changing a position of the roof panel by moving front and rear guide members coupled to the roof panel along a longitudinally extending guide track that extends continuously along the opening and rearward of the opening; and positioning the roof panel in a second position exposing at least a portion of the opening and extending over at least a portion of a fixed backlite located rearward of the opening.

According to still another aspect, a method of installing a modular automotive vehicle open air system onto an automotive vehicle includes: (a) preassembling the backlite and the moveable roof assembly to the frame at a first station removed from the vehicle; and (b) assembling the modular open air system at a second station onto the vehicle.

Further areas of applicability will become apparent from the description provided herein. The description and specific examples are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a side elevational view of a portion of the open air system of FIG. 1 illustrating the roof panel in the closed position in solid line and in the fully open position in phantom;

FIG. 6 is a perspective view of a portion of a moveable roof assembly of the open air system of FIG. 1;

DETAILED DESCRIPTION

Figure 1:
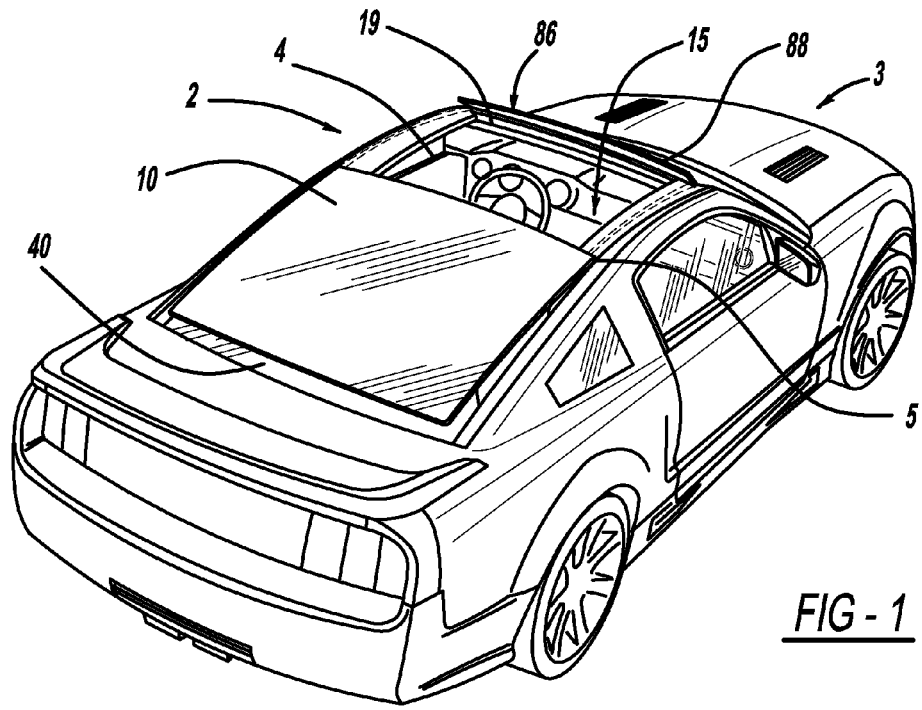
FIG. 1 is a perspective view of an automotive vehicle having an open air system constructed in accordance with the teachings of the present disclosure with a moveable roof panel in an open position.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

When describing the various embodiments of vehicle and open air system herein, at times only one side of vehicle and/or open air system may be shown or discussed. It should be appreciated, however, that the other side is essentially a mirrored image of the one discussed and illustrated. Moreover, as used herein, the term "fore" and "aft", "front" and "rear", and "longitudinal", may be used to refer to a direction corresponding to extending from the front of the vehicle toward the rear of the vehicle. Additionally, the term "transverse" refers to a cross-vehicle direction and is generally orthogonal to the longitudinal direction of the vehicle. Furthermore, the terms "outside," "inside," "outward," and "inward" refer to the position relative to the longitudinal center axis of the vehicle. Finally, when describing similar features of the various embodiments herein, like reference indicia may be used to describe the similar features.

With reference to FIGS. 1-6 and 15-16, an automotive vehicle open air system 2 for an automotive vehicle 3 can include an opening 4 defined by a frame 5, a first guide track 6 and a second guide track 8, a roof panel 10 fixedly coupled to a reinforcement carriage 9, a first pair of guide members 12, and a second pair of guide members 14. Guide members 12, 14 are attached to extensions of carriage 9. Frame 5 includes first and second longitudinally extending members 11, 13, and transversely extending members which can include a front header 19, a rear header 21, and an intermediate member 23. Opening 4 can be above a passenger area 15 of vehicle 3 and can have a longitudinally extending first side 16 and a longitudinally extending second side 18 that are transversely spaced apart. First guide track 6 is disposed on first frame member 11 and can extend longitudinally along first side 16 of opening 4. Second guide track 8 is disposed on second frame member 13 and can extend longitudinally along second side 18 of opening 4.

Figure 2:
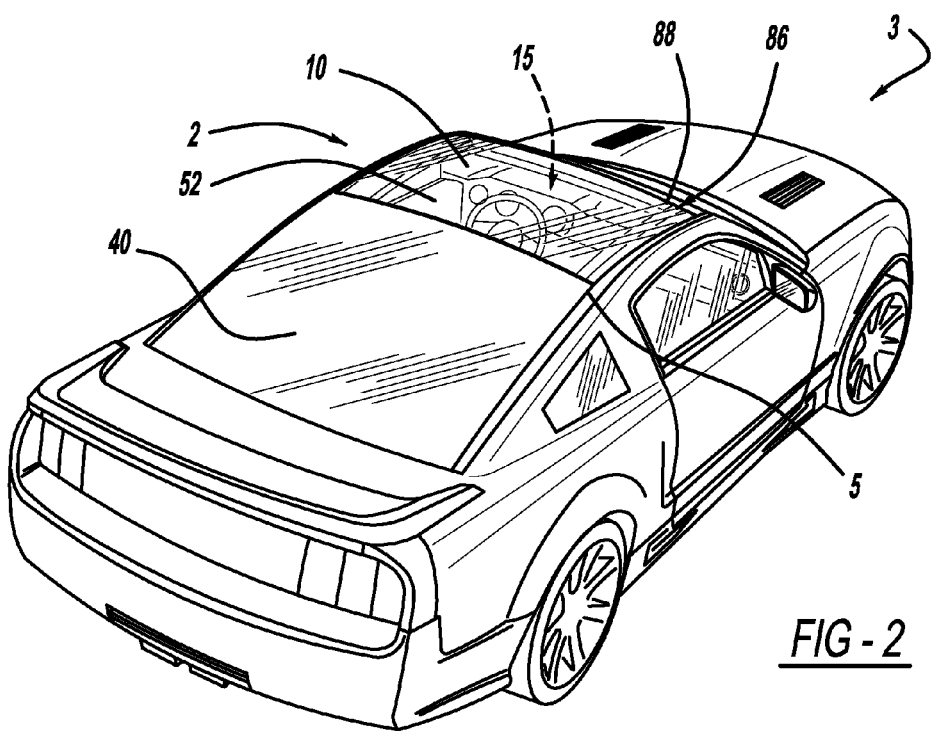
FIG. 2 is a perspective view of the automotive vehicle having the open air system of FIG. 1 with the roof panel in a closed position.
Figure 3:
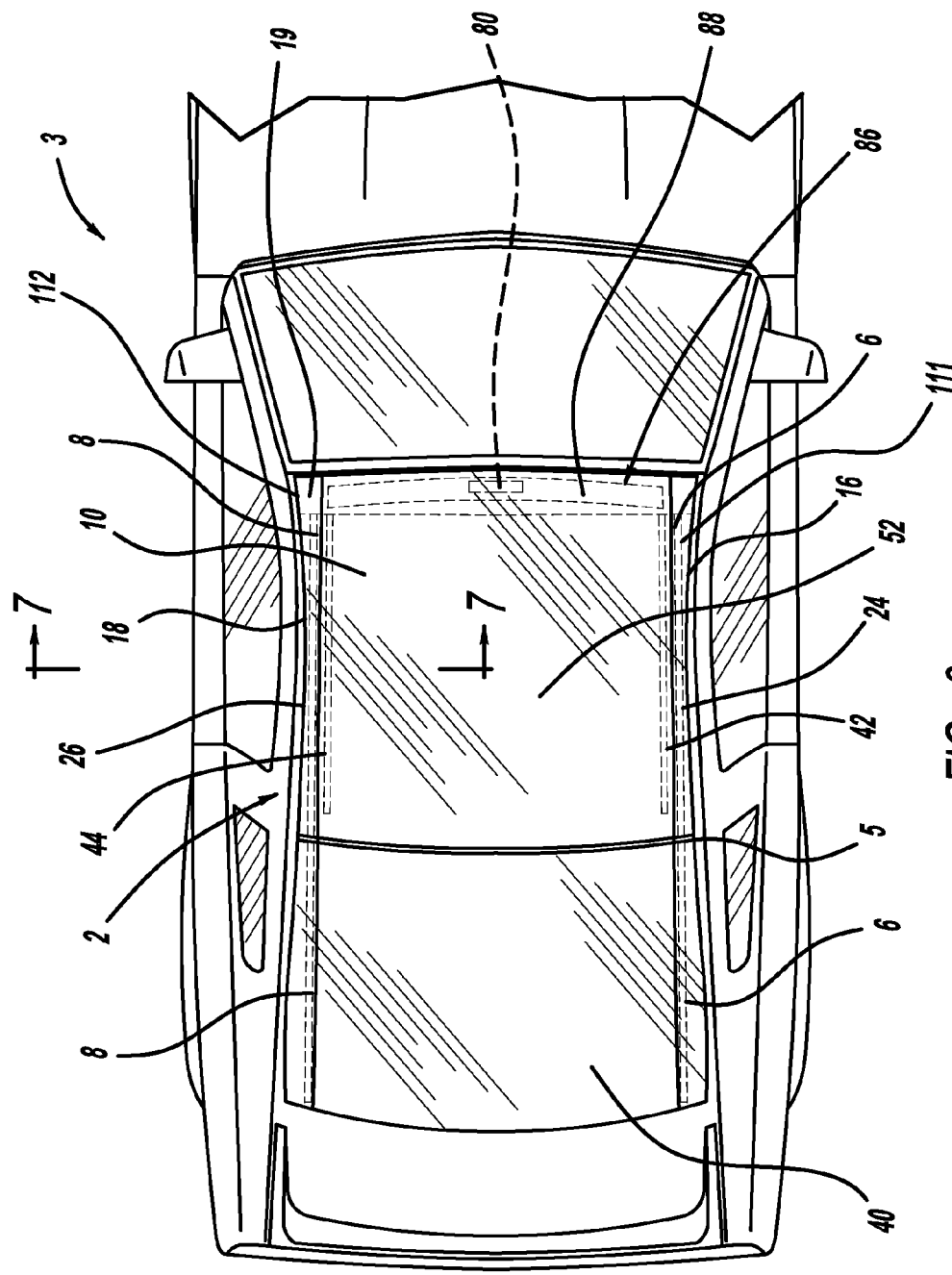
FIG. 3 is a fragmentary top plan view of the vehicle of FIG. 2.
Figure 4:
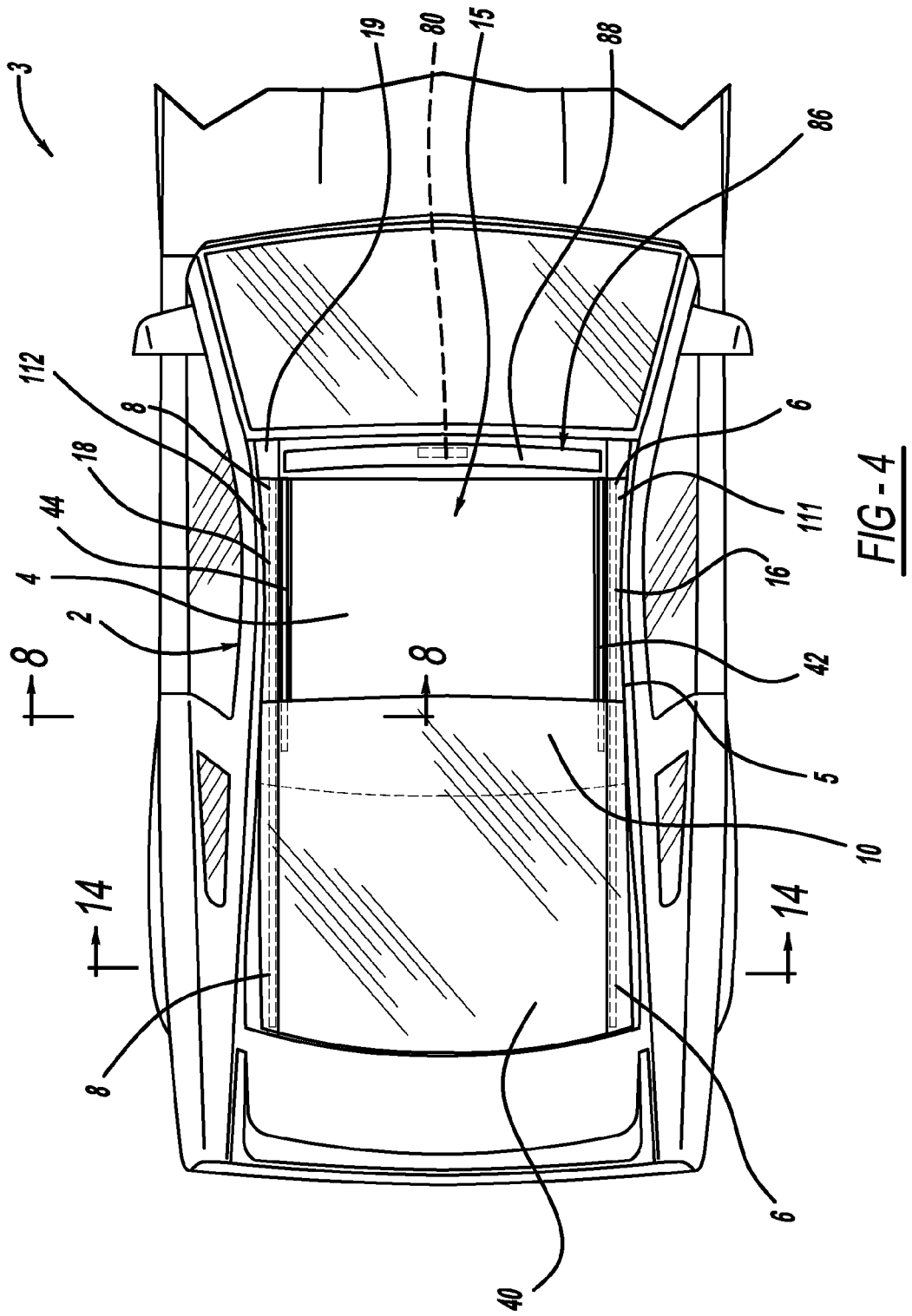
FIG. 4 is a fragmentary top plan view of the vehicle of FIG. 1.

Roof panel 10 is moveable relative to opening 4 between a closed position covering opening 4 and passenger area 15, as shown in FIGS. 2 and 3, and a fully open position exposing at least a portion of opening 4 and passenger area 15, such as that shown in FIGS. 1 and 4, or intermediate positions therebetween. Carriage 9 and roof panel 10 move together. Roof panel 10 can have a longitudinally extending first side 24 and a longitudinally extending second side 26 that are transversely spaced apart. Frame 5, guide tracks 6 and 8, carriage 9, and first and second pairs of guide members 12 and 14 can be made of the same material or different materials. By way of non-limiting example, frame 5 and the components that make up frame 5 can be made from aluminum, magnesium, steel, and the like. Additionally, frame 5 and the components that make up frame 5 can also be made from a polymeric material such as a sheet molded compound and the like. Roof panel 10 can be made of transparent or translucent glass or polymer.

With specific reference to FIG. 6, first pair of guide members 12 can be coupled to carriage 9 adjacent first side 24 of roof panel 10 and engaged with first guide track 6. Second pair of guide members 14 can be coupled to carriage 9 adjacent second side 26 of roof panel 10 and engaged with second guide track 8. First pair of guide members 12 can include front guide member 12a and rear guide member 12b coupled respectively to carriage 9 adjacent front portion 28 and rear portion 30 of roof panel 10. Second pair of guide members 14 can include front guide member 14a and rear guide member 14b coupled respectively to carriage 9 adjacent front portion 28 and rear portion 30 of roof panel 10. First pair of guide members 12a and 12b and second pair of guide members 14a and 14b can move along respective first and second guide tracks 6 and 8 as roof panel 10 moves between closed and open positions. It can be appreciated that the guide members can be rollers, sliders, or any other kind that can move along the respective guide tracks with which they are engaged.

With reference to FIGS. 1, 2, 5, 6, 9, and 10, first and second guide tracks 6 and 8 can each include a front camming surface 32a and a rear camming surfaces 32b that change a vertical elevation of roof panel 10 as first and second pairs of guide members 12a, 12b, and 14a, 14b move along respective first and second guide tracks 6 and 8. First and second pairs of guide members 12 and 14 are disposed in camming surfaces 32a, 32b when roof panel 10 is in closed position. First and second pairs of guide members 12 and 14 are disposed in respective first and second guide tracks 6 and 8 (as shown in phantom in FIGS. 9-10) out of camming surfaces 32a, 32b during a majority of the movement of roof panel 10 between the fully open position and the fully closed position.

With reference to FIGS. 1-5, open air system 2 can further include a fixed backlite 40. At least a portion of roof panel 10 can be disposed above backlite 40 when in the open position. First and second guide tracks 6 and 8 can extend longitudinally from adjacent front header 19 to a rearward position adjacent backlite 40. Backlite 40 can be made of transparent or translucent glass, a polymer, or other material.

With reference to FIGS. 3, 4, 8, 9, 11, 12, 13, and 15, open air system 2 can further include a first drive track 42 and a second drive track 44 extending longitudinally along first side 16 and second side 18 of opening 4. Drive tracks 42, 44 can be disposed on first and second frame members 11, 13, respectively. A first drive member 46 and a second drive member 48 can be coupled to roof panel 10 by a link 49 and can travel along respective first and second drive tracks 42 and 44. Movement of drive members 46 and 48 along drive tracks 42 and 44 can drive movement of roof panel 10 between closed and open positions.

Referring to FIGS. 1-4 and 14, backlite 40 can have a first transverse contour 54 while roof panel 10 can have a second transverse contour 56. In the particular example provided, an entirety of roof panel 10 is forward of backlite 40 in the closed position and a majority portion of roof panel 10 is disposed above backlite 40 in the fully open position. First transverse contour 54 of backlite 40 and second transverse contour 56 of roof panel 10 can be substantially similar. Roof panel 10 can be spaced apart from backlite 40 in a direction normal to an exterior surface 58 of backlite 40 a uniform distance D throughout a transverse overlap of roof panel 10 with backlite 40 when in the open position. First contour 54 can include a first radius of curvature $R_B$ Of backlite 40. Second contour 56 can include a second radius of curvature $R_P$ of roof panel 10. First and second radii of curvatures $R_B$ and $R_P$ are substantially identical. The similar contours and radii of curvature allow close nesting of roof panel 10 above backlite 40 when in the open position. The close nesting between roof panel 10 and backlite 40 can decrease noise caused by wind passing the gap between roof panel 10 and backlite 40 when operating vehicle, can decrease overall air resistance and thus in turn may improve fuel efficiency, and can make open air system on the vehicle more compact and more appealing.

Figure 7:
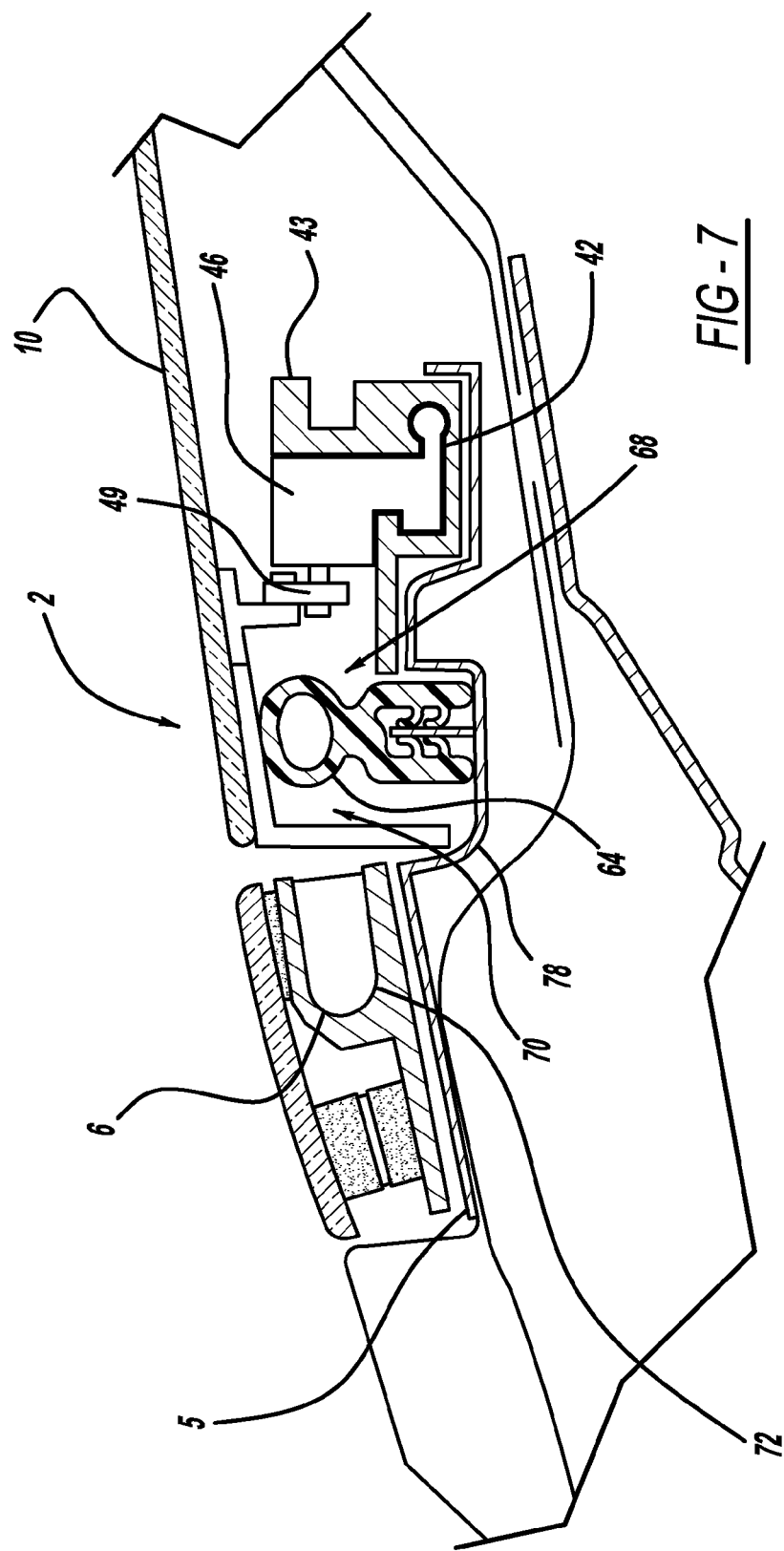
FIG. 7 is a fragmented cross-sectional view along line 7-7 of FIG. 3.
Figure 8:
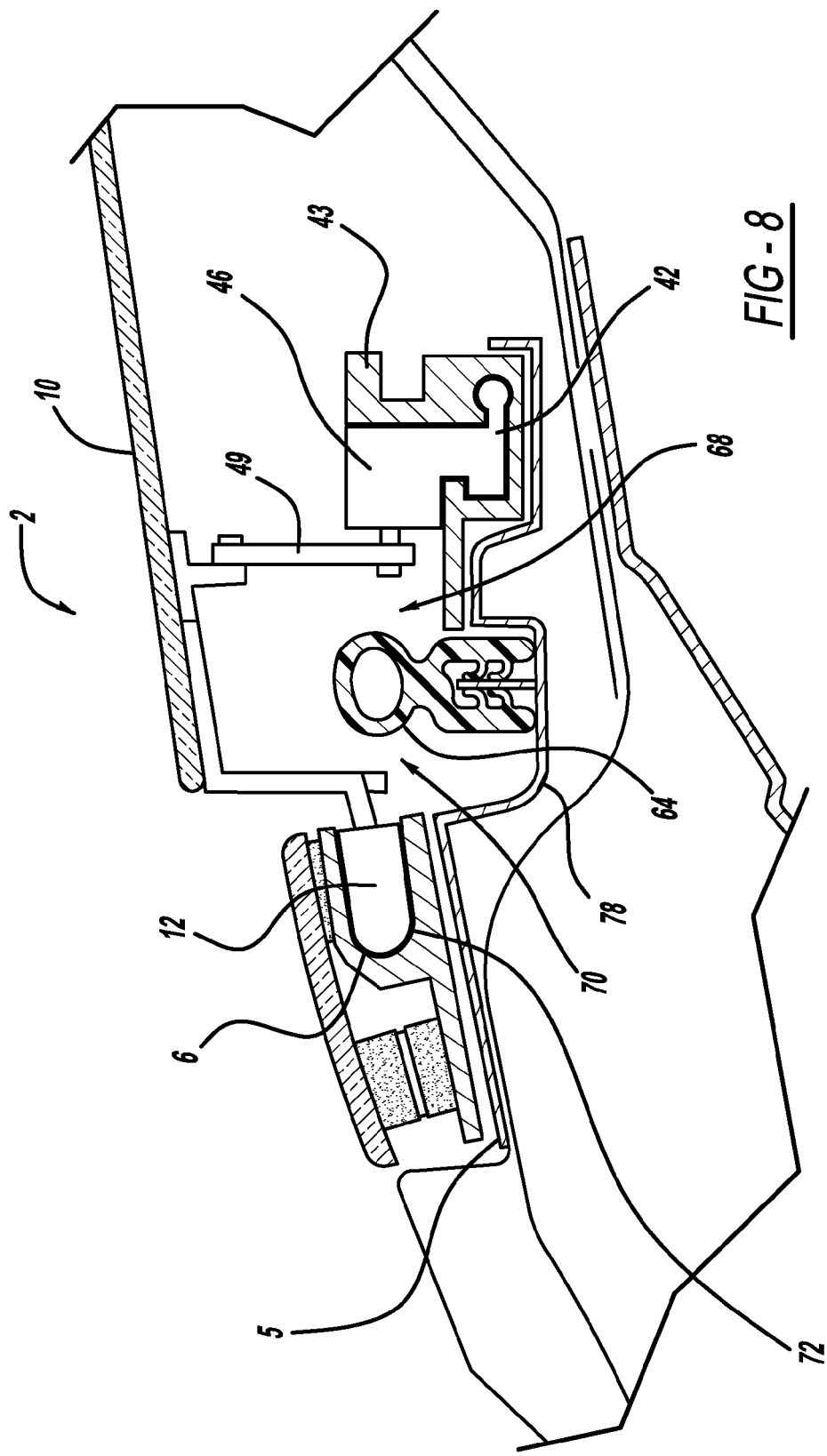
FIG. 8 is a fragmented cross-sectional view along line 8-8 of FIG. 4.
Figure 9:
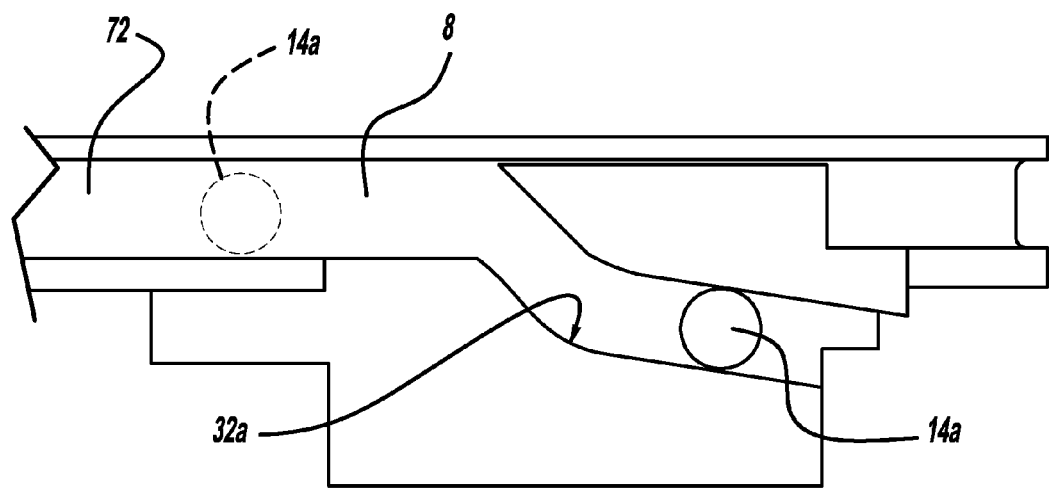
FIG. 9 is a fragmentary side view of a front camming block coupled to a guide track of the open air system of FIG. 1 illustrating a front guide member disposed in a front camming surface (closed position shown in solid line) and in the guide track (open position shown in phantom)
Figure 10:
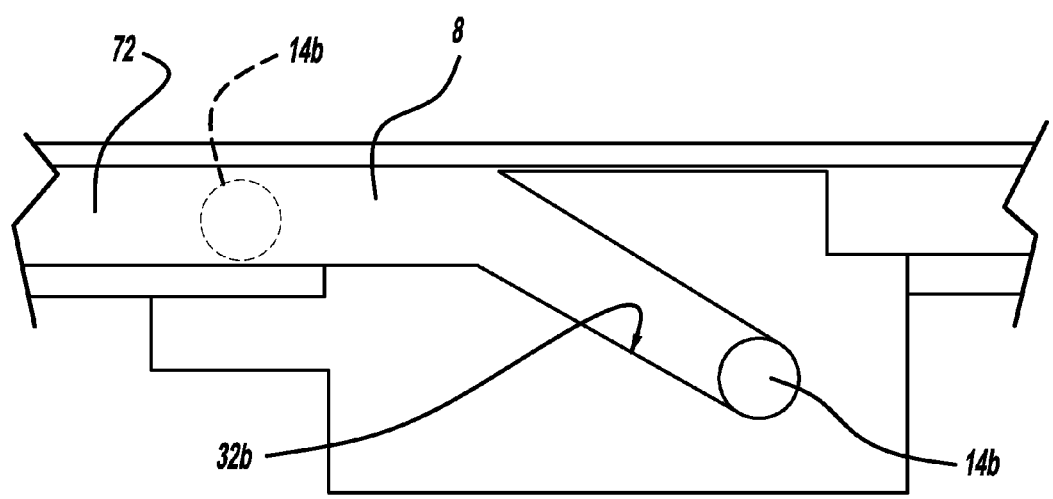
FIG. 10 is a fragmentary side view of a rear camming block coupled to the guide track of FIG. 9 illustrating a rear guide member disposed in a rear camming surface (closed position shown in solid line) and in the guide track (open position shown in phantom)
Figure 11:
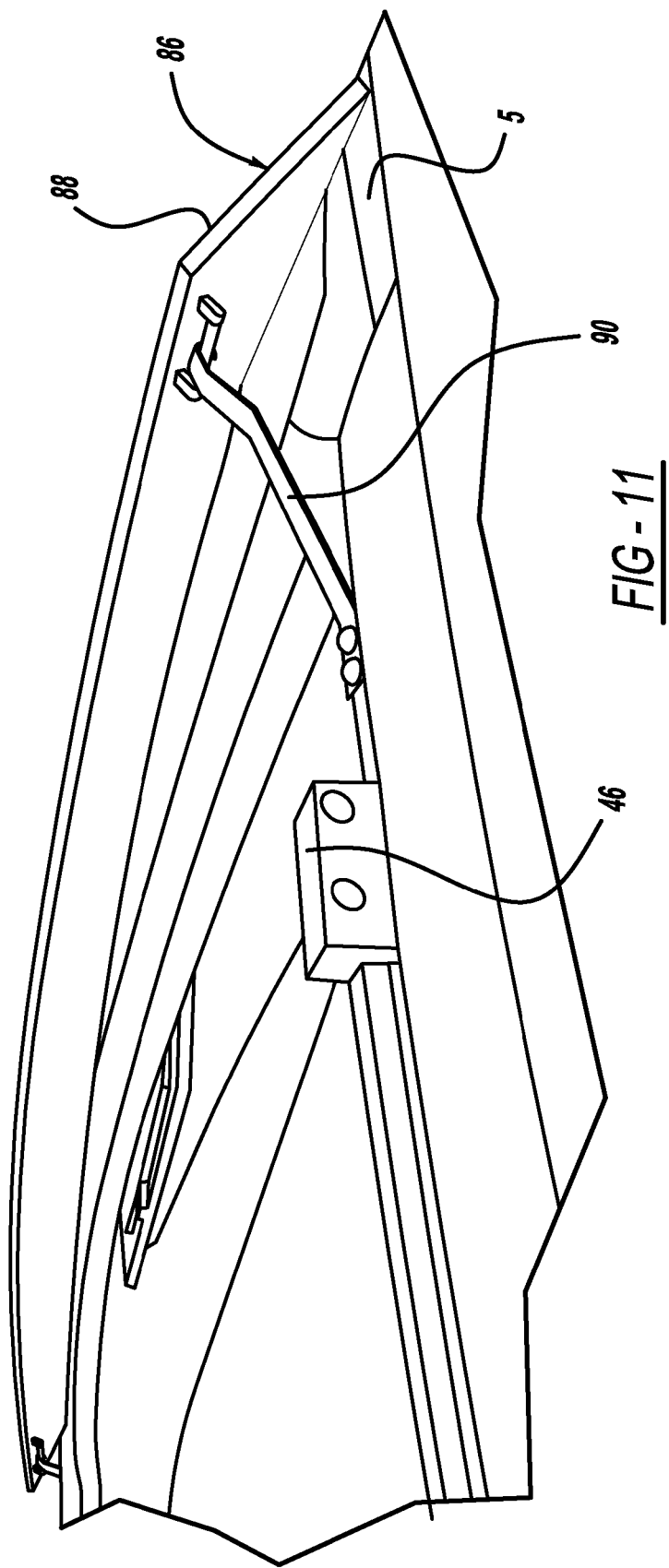
FIG. 11 is a fragmentary perspective view of a wind deflecting assembly of the open air system of FIG. 1 with a wind deflector in its raised position and with various components of the open air system removed for clarity.
Figure 12:
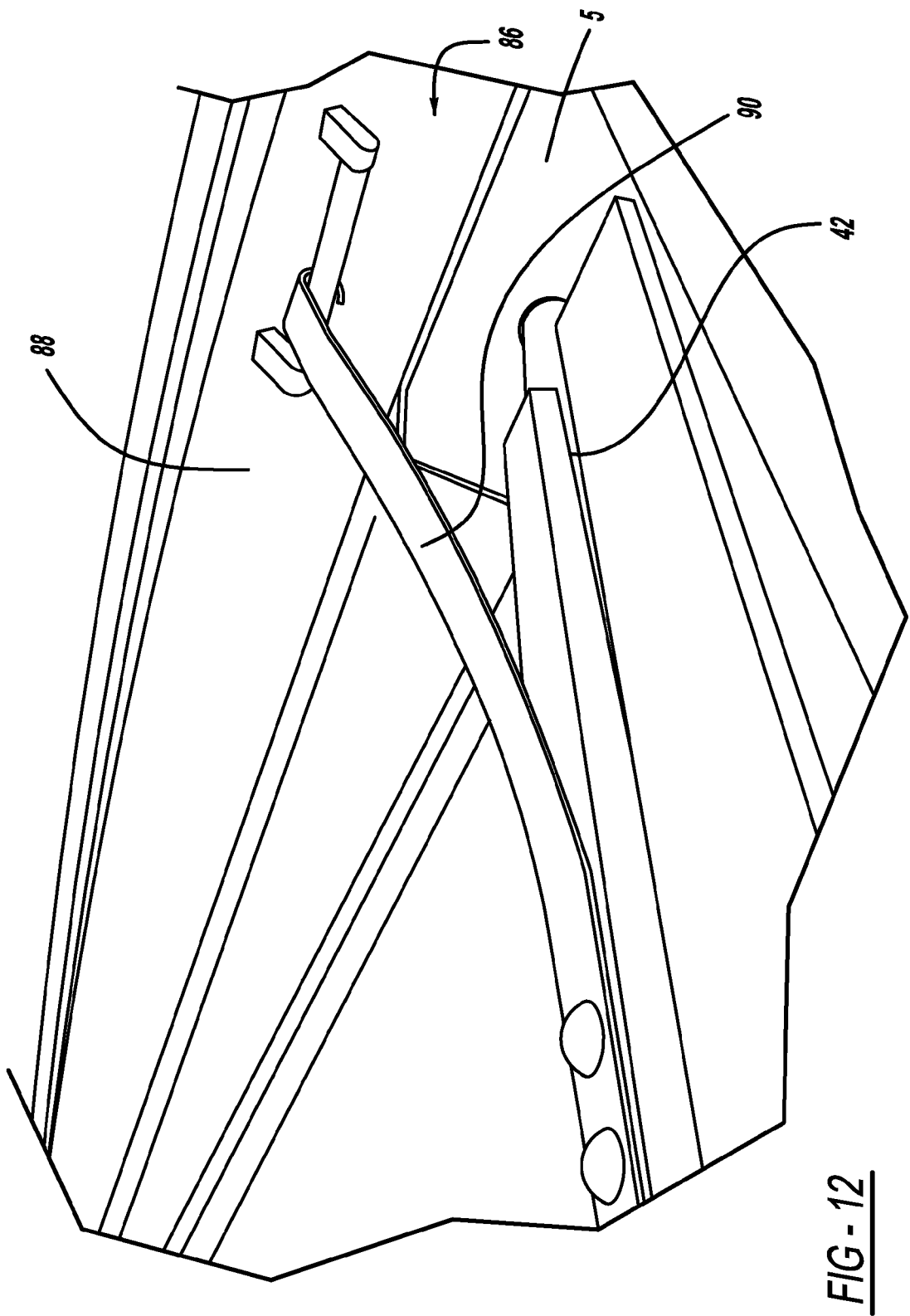
FIG. 12 is a close-up view of the wind deflecting assembly of FIG. 11.
Figure 13:
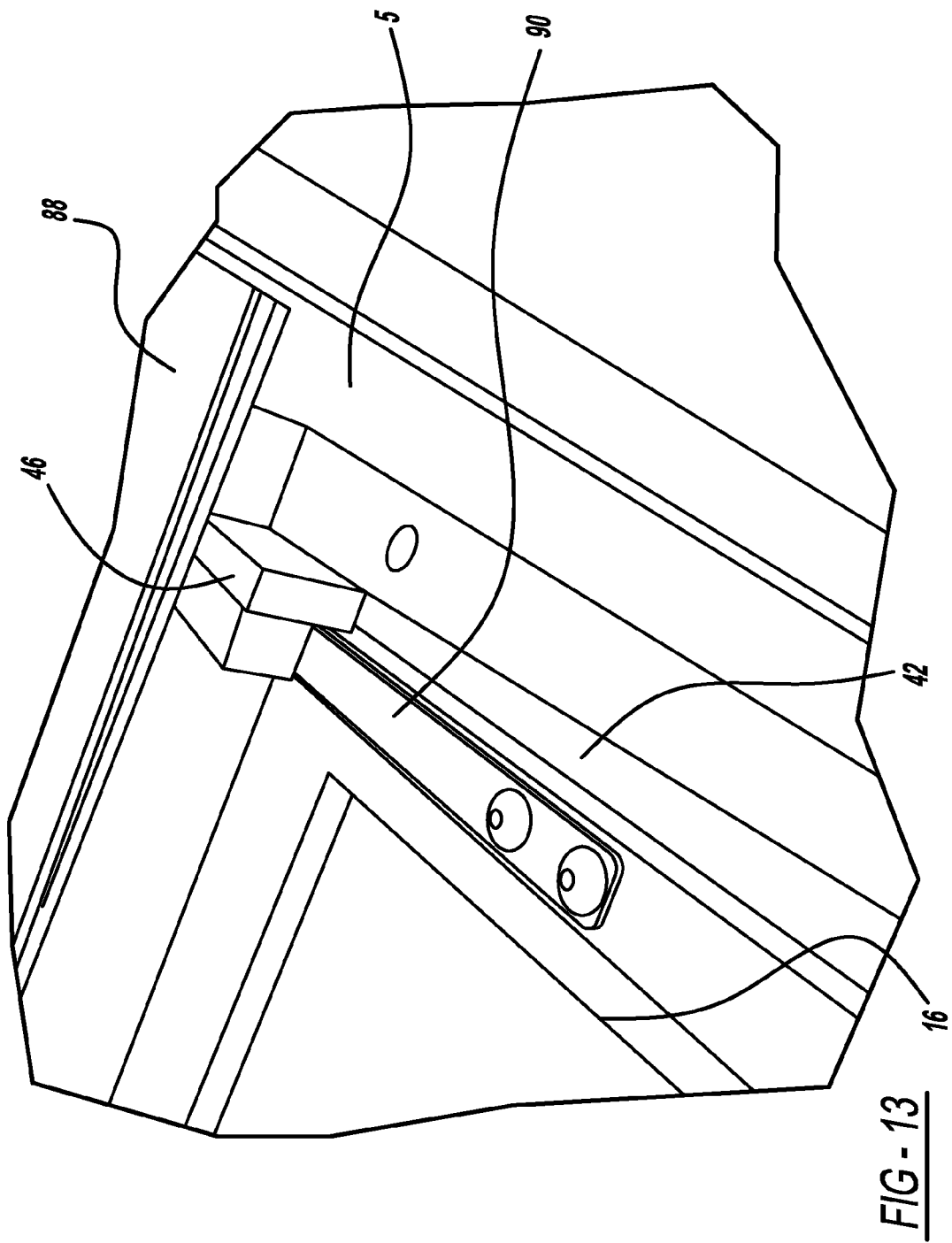
FIG. 13 is a fragmentary perspective view of the wind deflecting assembly of the open air system of FIG. 11 with the wind deflector in its retracted position.
Figure 14:
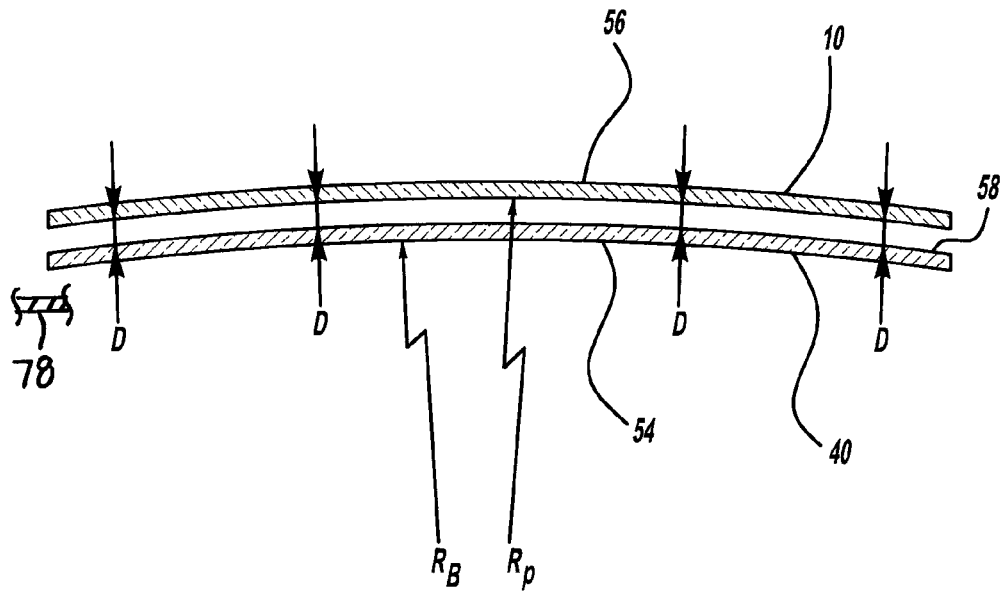
FIG. 14 is a simplified cross-sectional view along line 14-14 of FIG. 4.

With reference to FIGS. 7-10, guide track 6 includes a groove 72 that guide member 12 is disposed in and travels along. A seal member 64 is disposed on frame 5 and extends longitudinally between guide members 12, 14 and drive tracks 42, 44. Seal member 64 is sealingly engaged with roof panel 10 when in the closed position, as shown in FIG. 7, and is disengaged from roof panel 10 when in the open position, as shown in FIG. 8. Seal member 64 can define a boundary between a dry area 68 and a wet area 70. Frame 5 can have a recessed fluid collecting section 78 (e.g., a trough) in which seal member 64 is disposed. Fluid collecting section 78 can collect fluids, such as water, from wet area 70 and direct the fluid to one or more desired discharge locations. Guide track 6 can be positioned outside of seal member 64 in wet area 70. A majority of guide member 12 can be located outside of seal member 64 in wet area 70. Drive track 42 can be disposed inwardly of seal member 64 in dry area 68 and can also be disposed inwardly of fluid collecting section 78. With specific reference to FIGS. 7-8, a sunscreen guide track 43 can be coupled to drive track 42. A conventional sunscreen (not shown) can be coupled to sunscreen guide track 43 and move in the fore and aft direction.

With reference to FIGS. 1-5, and 11-13, automotive vehicle open air system 2 can include a wind deflecting assembly 86 coupled to front header 19. Wind deflecting assembly 86 can include a wind deflector 88 and a biasing member 90. Wind deflector 88 can be moveably coupled to front header 19 and is moveable between a retracted position at least partially disposed below roof panel 10, as shown in FIGS. 2, 3, 5, and 13, and a raised position, as shown in FIGS. 1, 4, 5 (in phantom), 11, and 12. In the example provided, wind deflector 88 can be pivotally coupled to front header 19 and can pivot between the retracted and raised positions. Biasing member 90 biases wind deflector 88 to raised position.

Biasing member 90 can extend longitudinally along first frame member 11 such that a portion of drive member 46 can engage and disengage with biasing member 90 during movement along drive track 42 and cause wind deflector 88 to move between the raised and retracted positions. Biasing member 90 can take a variety of forms. By way of non-limiting example, biasing member 90 can be a leaf spring coupled to wind deflector 88 and coupled adjacent drive track 42.

Drive member 46 can engage with leaf spring 90 and move a portion of leaf spring 90 downward when moving roof panel 10 from the open position to the closed position. Wind deflector 88 can be in the raised position when the portion of drive member 46 is disengaged from biasing member 90. Thus, a portion of drive member 46 can engage with biasing member 90 and cause wind deflector 88 to move between the raised and retracted positions as drive member 46 moves along drive track 42 and drives movement of roof panel 10 between the open and closed positions.

Figure 18:
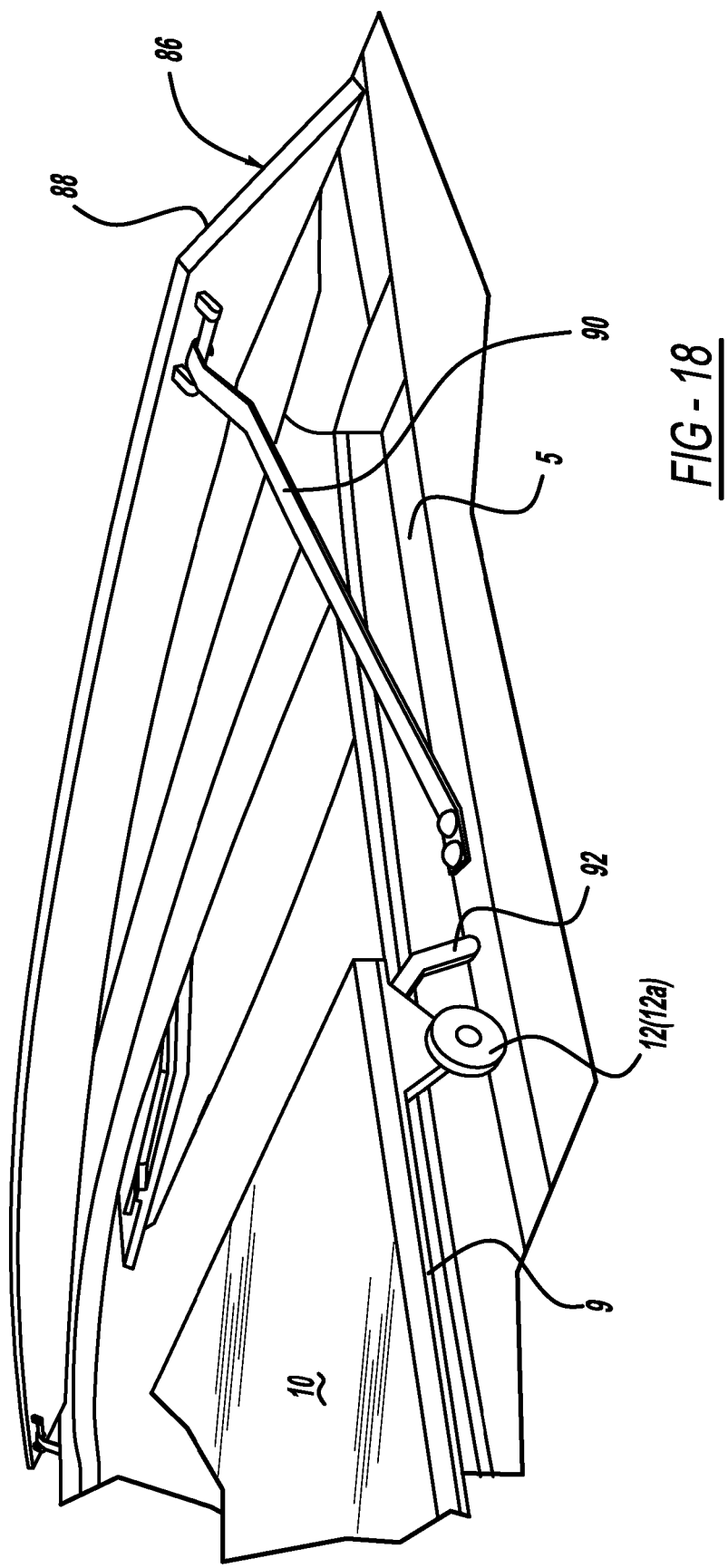
FIG. 18 is a fragmented perspective view of an alternate arrangement of the wind deflecting assembly with various components removed for clarity.

Referring to FIG. 18, an alternate arrangement for wind deflecting assembly 86 and open air system 2 is shown. In this embodiment, biasing member 90 is disposed adjacent the guide track and is outside of the seal that separates wet area 70 and dry area 68. Carriage 9 includes an extension or projection 92 that engages and disengages with biasing member 90 during movement of roof panel 10 between the open and closed positions, in a manner similar to that described above with reference to drive member 46. Thus, a portion of carriage 9 can engage with biasing member 90 and cause wind deflector 88 to move between the raised and retracted positions as roof panel 10 moves between the open and closed positions.

Open air system 2 can further include a drive system 118, which has an actuator 80 disposed in front header 19 or intermediate member 23 and coupled to drive members 46, 48 through drive cables 110, 115. Actuator 80 drives movement of drive cables 110, 115 which in turn drive drive members 46, 48 along drive tracks 42, 44, respectively. Drive System 118 can also have a switch (not shown) to control operation of the system.

Frame 5 can have a front portion and a rear portion. Front portion of frame 5 includes the front portions of frame members 11, 13, front header 19, and intermediate member 23. Seal member 64 can extend along the front portion of frame 5. A rear portion of frame 5 includes rear portions of frame members 11, 13, rear header 21, and intermediate member 23. Frame 5 can include a rear seal member 114 that extends along frame 5 and seals against backlite 40, rear edge of roof panel 10, and trim members 111, 112.

Figure 15:
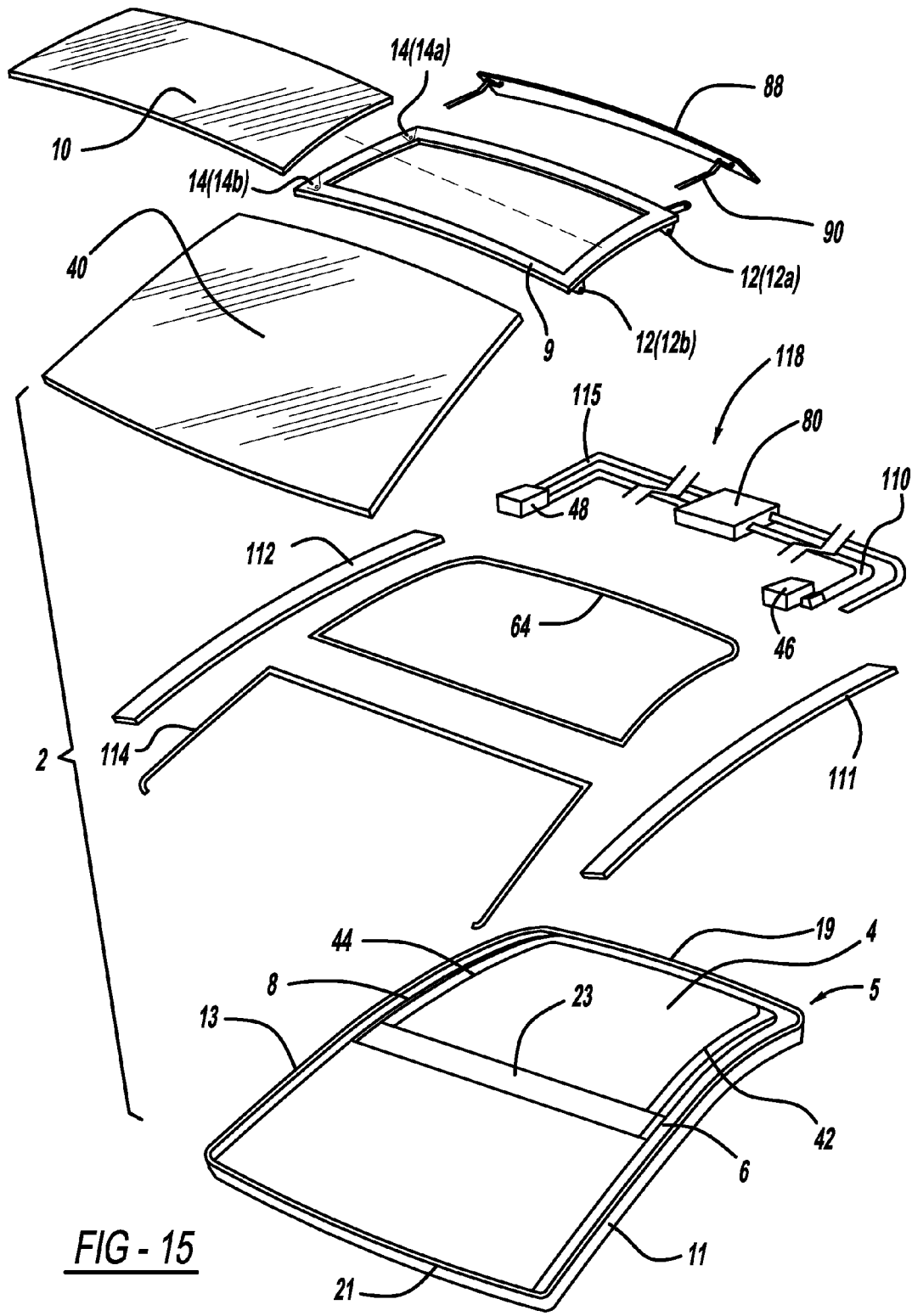
FIG. 15 is an exploded perspective view of the automotive vehicle open air system constructed in accordance with the teachings of the present disclosure.

With specific reference to FIGS. 3 and 15, moveable roof assembly 52 can also include two cover trim members 111, 112 coupled to frame members 11 and 13, respectively, and disposed above first and second guide tracks 6 and 8, respectively, to cover them.

Figure 16:
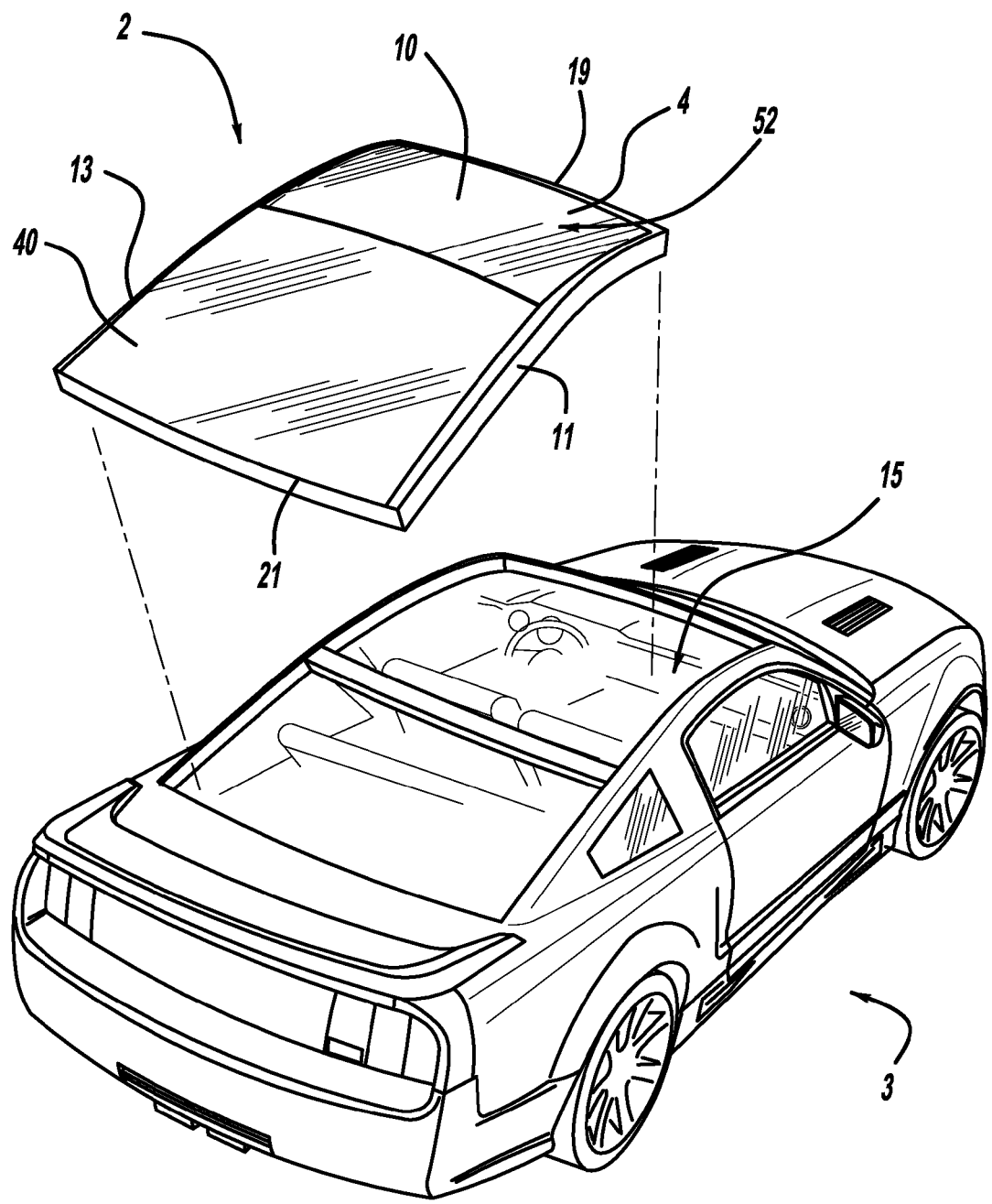
FIG. 16 is a perspective view of the automotive vehicle open air system of FIG. 15 being assembled onto the vehicle as a modular assembly.

With reference to FIGS. 15 and 16, the modular aspect of automotive vehicle open air system 2 is shown. Backlite 40 can be fixedly mounted in frame 5. With specific reference to FIG. 16, frame 5, backlite 40, and moveable roof assembly 52 can be installed in vehicle 3 as an assembled modular unit.

With reference to FIGS. 1-6, a method of operating automotive vehicle open air system 2 can include positioning moveable roof panel 10 in a closed position covering roof opening 4. A position of roof panel 10 can be changed by moving front and rear guide members 12a and 12b coupled to roof panel 10 along longitudinally extending guide track 6 which can extend continuously along opening 4 and rearward of opening 4. Roof panel 10 can be positioned in the open position exposing at least a portion of opening 4 and extending over at least a portion of fixed backlite 40 located rearward of opening 4. With specific reference to FIGS. 9 and 10, changing the position of roof panel 10 can include changing an elevation of roof panel 10 by moving front and rear guide members 14a and 14b into and out of respective front and rear camming surfaces 34a and 34b in guide track 8 when moving roof panel 10 from closed position toward open position.

With reference to FIGS. 1-6 and 11-13, changing the position of roof panel 10 can also include moving drive member 46 coupled to roof panel 10 along drive track 42. Movement of drive member 46 can drive movement of roof panel 10 between the closed and open positions. Moving roof panel 10 from the closed position to the open position can allow wind deflector 88 to move from the lowered stored position to the raised operable position with drive member 46 disengaging with biasing member 90. Positioning roof panel 10 in the closed position can include moving wind deflector 88 from the raised operable position to lowered stored position with drive member 46 engaging with and moving biasing member 90 that biases wind deflector 88 to raised position.

Figure 17:
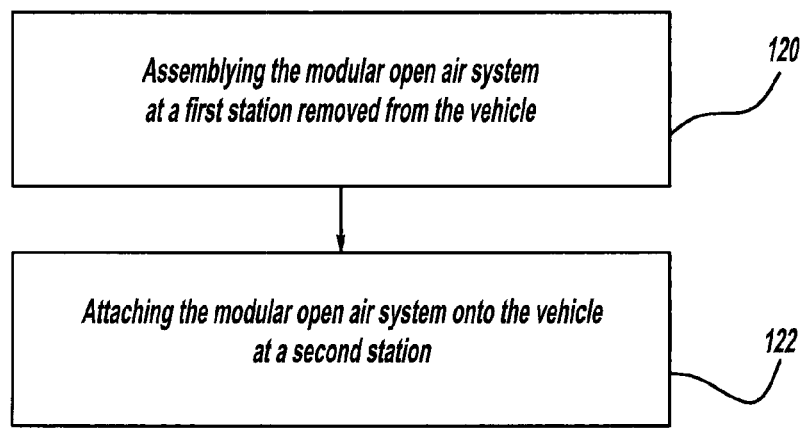
FIG. 17 is a flow chart illustrating a method of installing the automotive vehicle open air system of FIG. 15 as a modular assembly onto the automotive vehicle.

With reference to FIGS. 15-17, the method of installing modular automotive vehicle open air system 2 onto automotive vehicle 3 can include assembling the modular automotive vehicle open air system 2 at a first station which is removed from the vehicle, as indicated in block 120. Assembling the modular open air system 2 can include attaching backlite 40 and seal member 114 to frame 5. Additionally, moveable roof assembly 52 along with seal member 64 and drive system 118 can be coupled to frame 5 at the first station. Wind deflecting assembly 86 can also be coupled to frame 5 at the first station. In some embodiments, trim members 111, 112 can also be attached at the first station. In other embodiments, trim members 111, 112 are attached after open air system 2 is coupled to vehicle 3. With the modular open air system 2 assembled, the open air system 2 can be attached onto vehicle 3 at a second station, such as the final assembly line, by way of non-limiting example, as indicated in block 122. When attaching modular open air system 2 onto vehicle 3, the electrical connections for drive system 118 are also performed. Modular open air system 2 can be attached to frame 5 through the use of adhesives, mechanical fasteners, and the like.

While the present disclosure has been described with reference to the preferred embodiment, it should be appreciated that the various features and functions disclosed therein can be combined, altered and/or removed without deviating from the scope of the present disclosure, although all of the benefits may not be realized. For example, frame 5 can be made of multiple individual components that are coupled together or a single integral component. Guide tracks 6, 8 can be separate components or integrated with frame 5 side members 11, 13. Similarly, drive tracks 42 can be separate components or integrated with frame 5 side members 11, 13. Guide tracks 6, 8 and drive tracks 42 could all be in a dry area. Moreover, while open air system 2 is shown as a modular unit, it may be capable of being a non-modular assembly although all of the benefits may not be realized. In addition, the dimensions, shapes, kinematics, and orientations of the various components can differ from that shown based on the design of the vehicle and the desired design of the open air system 2, although all of the benefits may not be realized. Furthermore, additional garnishes or trim pieces can be employed to the open air system 2 to provide a desired aesthetic appearance and/or to enhance management of water flow.

The foregoing description of the invention is merely exemplary in nature and has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An automotive vehicle open air system comprising:
   a fixed roof member;
   at least one guide track extending along the fixed roof member;
   a backlite attached to the fixed roof member;
   a moveable roof assembly coupled to the fixed roof member, the roof assembly including:
      a roof panel moveable in a fore and aft direction relative to the fixed roof member, between first and second positions;
      at least one guide member coupled to a front portion of the roof panel and engaged with the at least one guide track, the at least one guide member moving along the at least one guide track with the movement of the roof panel between the first and second positions; and
      a longitudinally extending seal member sealingly engaged with the roof panel when in the first position and being disengaged from the roof panel when in the second position, the seal member defining a boundary between a dry area and a wet area,
   wherein the at least one guide track is positioned outside of the seal member in the wet area, with the at least one guide track exposed to exterior elements when the roof panel is in the first position.

2. The open air system of claim 1, wherein the at least one guide track includes first and second guide tracks each including front and rear camming surfaces that change a vertical elevation of the roof panel as the first and second pairs of guide members move along the respective first and second tracks.

3. The open air system of claim 1, wherein an entirety of the roof panel is forward of the backlite in the first position and a majority portion of the roof panel is disposed above the backlite in the second position.

4. The open air system of claim 1, wherein:
   the backlite has a first transverse contour;
   the roof panel has a second transverse contour; and
   the first contour includes a first radius of curvature of the backlite, the second contour includes a second radius of curvature of the roof panel, and the first and second radius of curvatures are substantially identical.

5. The open air system of claim 1, wherein the at least one guide track has a track groove and the at least one guide member is disposed in and travels along the track groove.

6. The open air system of claim 1, wherein the at least one guide member extends outwardly beyond the roof panel.

7. The open air system of claim 1, wherein a majority of the at least one guide member is located outside of the seal member in the wet area when the roof panel is in the first position.

8. The open air system of claim 1, further comprising:
   at least one drive track disposed inwardly of the seal member in the dry area; and
   a drive member disposed in the at least one drive track and coupled to the roof panel, movement of the drive member along the at least one drive track driving movement of the roof panel between the first and second positions.

9. The open air system of claim 8, further comprising an actuator coupled to the drive member and driving movement of the drive member along the at least one drive track.

10. The open air system of claim 1, further comprising a leaf spring coupled to a wind deflector and coupled adjacent the at least one guide track, and a drive member engaging with the leaf spring and moving a portion of the leaf spring downward when moving the roof panel.

11. The open air system of claim 1, further comprising at least a portion of a wind deflector being located below the roof panel when in a retracted position.

12. An automotive vehicle open air system comprising:
   a fixed roof member;
   at least one guide track extending along the fixed roof member;
   a backlite attached to the fixed roof member;
   a moveable roof assembly coupled to the fixed roof member, the roof assembly including:
      a roof panel moveable in a fore and aft direction relative to the fixed roof member, between first and second positions;
      at least one guide member coupled to a front portion of the roof panel and engaged with the at least one guide track, the at least one guide member moving along the at least one guide track with the movement of the roof panel between the first and second positions;
      a longitudinally extending seal member sealingly engaged with the roof panel when in the first position and being disengaged from the roof panel when in the second position, the seal member defining a boundary between a dry area and a wet area;
   a fluid collecting member extending along the fixed roof member with at least a portion of the fluid collecting member extending inwardly from the fixed roof member and disposed below the backlite and the roof panel,
   wherein the at least one guide track is positioned outside of the seal member in the wet area, the seal member is disposed in and sealingly engaged with at least a section of the fluid collecting member, and the at least one guide member is positioned outside the fluid collecting member.

13. The open air system of claim 12, further comprising:
   at least one drive track disposed inwardly of the fluid collecting member; and
   a drive member disposed in the at least one drive track and coupled to the roof panel, movement of the drive member along the at least one drive track driving movement of the roof panel between the first and second positions,
   wherein the seal member extends longitudinally along the fluid collecting member between the at least one guide track and the at least one drive track.

14. The open air system of claim 12, wherein the fluid collecting member is a trough.

15. The open air system of claim 12, further comprising a drive member engaging and disengaging with a biasing member and causing a wind deflector to move between raised and retracted positions.

16. The open air system of claim 12, further comprising a carriage engaging and disengaging with a biasing member and causing a wind deflector to move between raised and retracted positions.

17. The open air system of claim 12, wherein the frame, the backlite, and the moveable roof assembly are adapted to be installed in the vehicle as a modular unit.

18. The open air system of claim 12, further comprising:
at least one drive track disposed inwardly of the seal member in the dry area; and
a drive member disposed in the at least one drive track and coupled to the roof panel, movement of the drive member along the at least one drive track driving movement of the roof panel between the first and second positions.

19. The open air system of claim 18, further comprising:
an actuator coupled to the drive member and driving movement of the drive member along the at least one drive track.

* * * * *